US012775714B2

(12) United States Patent
Cimijotti et al.

(10) Patent No.: US 12,775,714 B2
(45) Date of Patent: Oct. 27, 2026

(54) SYSTEM AND METHOD FOR IDENTIFYING SECURITY VULNERABILITIES IN SOFTWARE CODE

(71) Applicant: BANK OF AMERICA CORPORATION, Charlotte, NC (US)

(72) Inventors: Mark T. Cimijotti, Monroe, NC (US); Sanjay Lohar, Charlotte, NC (US); Anuja Mishra, Charlotte, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 31 days.

(21) Appl. No.: 18/799,591

(22) Filed: Aug. 9, 2024

(65) Prior Publication Data

US 2026/0044608 A1 Feb. 12, 2026

(51) Int. Cl.
*G06F 7/04* (2006.01)
*G06F 21/57* (2013.01)

(52) U.S. Cl.
CPC ...... *G06F 21/577* (2013.01); *G06F 2221/033* (2013.01)

(58) Field of Classification Search
CPC ......................... G06F 21/577; G06F 2221/033
See application file for complete search history.

(56) References Cited

U.S. PATENT DOCUMENTS 10,650,150 B1 * 5/2020 Rajasooriya ............. G06N 7/01
11,516,222 B1 * 11/2022 Srinivasan ............ G06F 21/577
2004/0221176 A1 * 11/2004 Cole ..................... G06F 21/577 726/25
2016/0127408 A1 * 5/2016 Miu .................... H04L 63/1458 726/25
2018/0278642 A1 * 9/2018 Joy ....................... G06F 9/5044
2019/0018967 A1 * 1/2019 Ramasamy ........... G06F 21/577
2021/0034752 A1 * 2/2021 Canada ................. G06F 21/552
(Continued)

OTHER PUBLICATIONS

Keskin et al, Scoring Cyber Vulnerabilities Based On Their Impact On Organizational Goals, Apr. 30, 2021, IEEE, pp. 1-6. (Year: 2021).*

(Continued)

*Primary Examiner* — Philip J Chea
*Assistant Examiner* — Jenise E Jackson
(74) *Attorney, Agent, or Firm* — Moore & Van Allen PLLC; Nicholas C. Russell

(57) ABSTRACT

Embodiments of the present invention provide a system for identifying security vulnerabilities in software code. The system is configured for extracting, from an entity system, internal standards associated with software code of entity applications associated with an entity, extracting external standards associated with the software code of the entity applications from external systems, extracting severity ratings associated with known vulnerabilities, calculating modified severity ratings associated with the known vulnerabilities that are specific to the entity, performing assessment of the software code associated with the entity applications, via an artificial intelligence engine, to generate an output associated with the assessment of the software code based at least on the internal standards, the external standards, and the modified severity ratings, and performing one or more actions based on the generated output associated with the assessment of the software code.

14 Claims, 5 Drawing Sheets

(56) References Cited

U.S. PATENT DOCUMENTS

| | | | | |
|---|---|---|---|---|
| 2021/0312058 | A1* | 10/2021 | Chiarelli | G06Q 10/067 |
| 2023/0281317 | A1* | 9/2023 | Clement | G06F 8/75<br>726/25 |
| 2024/0202099 | A1* | 6/2024 | Choi | G06F 21/577 |
| 2025/0013464 | A1* | 1/2025 | Singh | G06F 9/44505 |
| 2025/0077400 | A1* | 3/2025 | Sen | G06F 11/3698 |
| 2025/0265457 | A1* | 8/2025 | Sharma | G06N 3/08 |
| 2025/0328652 | A1* | 10/2025 | Vaezi | G06F 21/577 |

OTHER PUBLICATIONS

Malin et al, Vulnerabilities, Influences and Interaction Paths: Failure Data for Integrated System Risk Analysis, Mar. 11, 2006, IEEE, pp. 1-12. (Year: 2006).*

* cited by examiner

SYSTEM AND METHOD FOR IDENTIFYING SECURITY VULNERABILITIES IN SOFTWARE CODE

BACKGROUND

There exists a need for a system for identifying security vulnerabilities in software code.

BRIEF SUMMARY

The following presents a summary of certain embodiments of the invention. This summary is not intended to identify key or critical elements of all embodiments nor delineate the scope of any or all embodiments. Its sole purpose is to present certain concepts and elements of one or more embodiments in a summary form as a prelude to the more detailed description that follows.

Embodiments of the present invention address the above needs and/or achieve other advantages by providing apparatuses (e.g., a system, computer program product and/or other devices) and methods for identifying security vulnerabilities in software code. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention.

In some embodiments, the present invention extracts, from an entity system, internal standards associated with software code of one or more entity applications associated with an entity, extracts external standards associated with the software code of the one or more entity applications from one or more external systems, extracts one or more severity ratings associated with one or more known vulnerabilities, calculates one or more modified severity ratings associated with the one or more known vulnerabilities that are specific to the entity, performs assessment of the software code associated with the one or more entity applications, via an artificial intelligence engine, to generate an output associated with the assessment of the software code based at least on the internal standards, the external standards, and the one or more modified severity ratings, and performs one or more actions based on the generated output associated with the assessment of the software code.

In some embodiments, the one or more actions comprise at least one of flagging the output for manual review, performing one or more remediation actions for decreasing impact of vulnerabilities identified during the assessment of the software code on downstream systems, and tracking the one or more remediation actions.

In some embodiments, the present invention trains the artificial intelligence engine with the internal standards, external standards, application programming standards, and entity vernacular associated with the entity.

In some embodiments, the present invention trains the artificial intelligence engine to perform input validation.

In some embodiments, the present invention receives an indication that the output is a false positive, analyzes the output associated with the assessment of the software code to determine one or more patterns in the assessment that led to the false positive, and stores the one or more patterns in a data repository.

In some embodiments, the present invention retrains the artificial intelligence engine with the one or more patterns.

In some embodiments, the one or more severity ratings are associated with different rating scales.

In some embodiments, the present invention calculates the one or more modified severity ratings based on determining a common scale for the entity and converting the one or more severity ratings that are associated with different rating scales to the common scale to generate the one or more modified severity ratings.

In some embodiments, the present invention determines the common scale based on the different rating scales that are associated with the one or more severity ratings.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
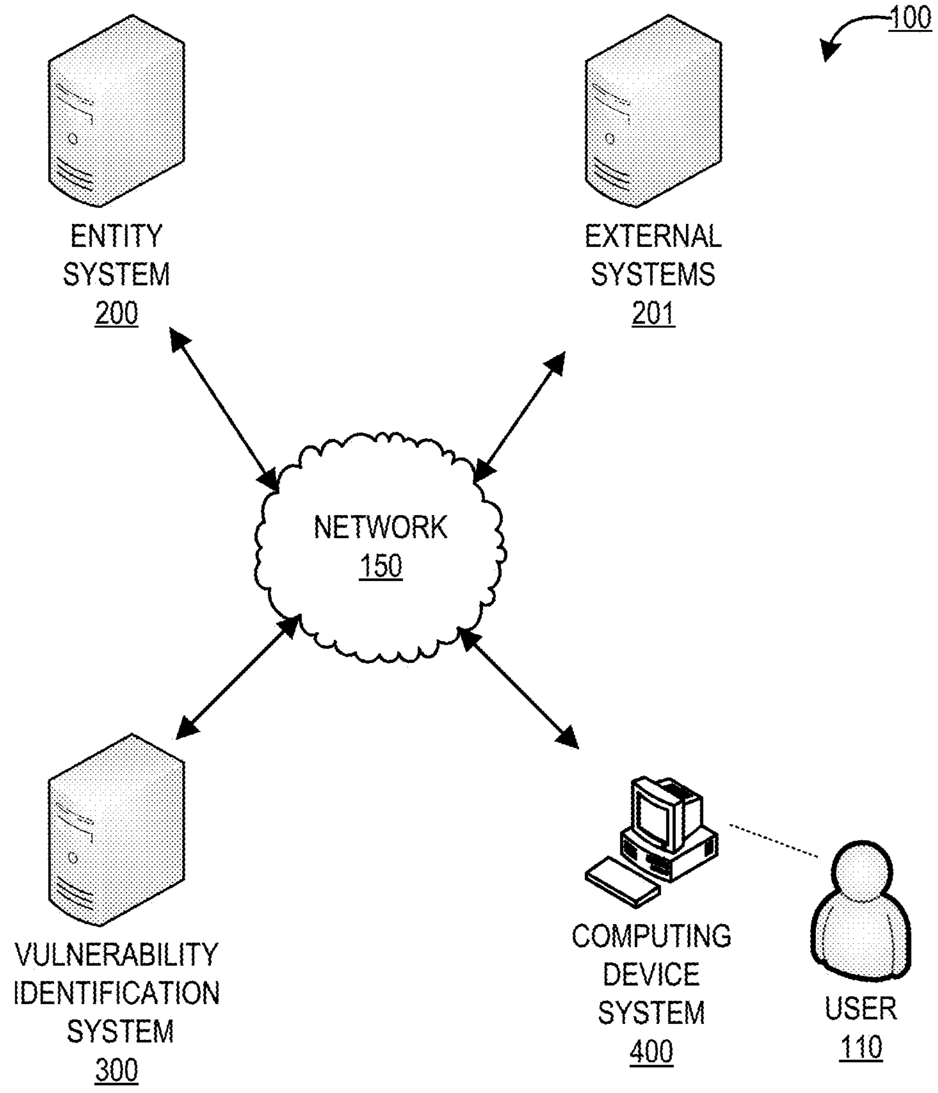
Figure 2:
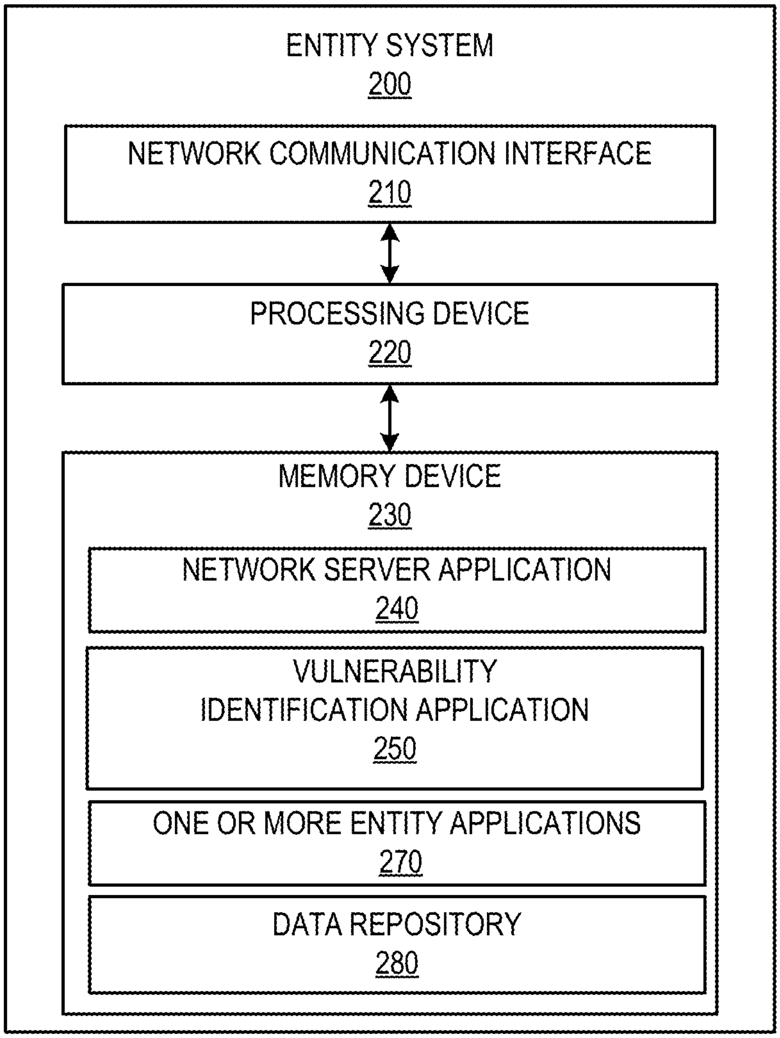
Figure 3:
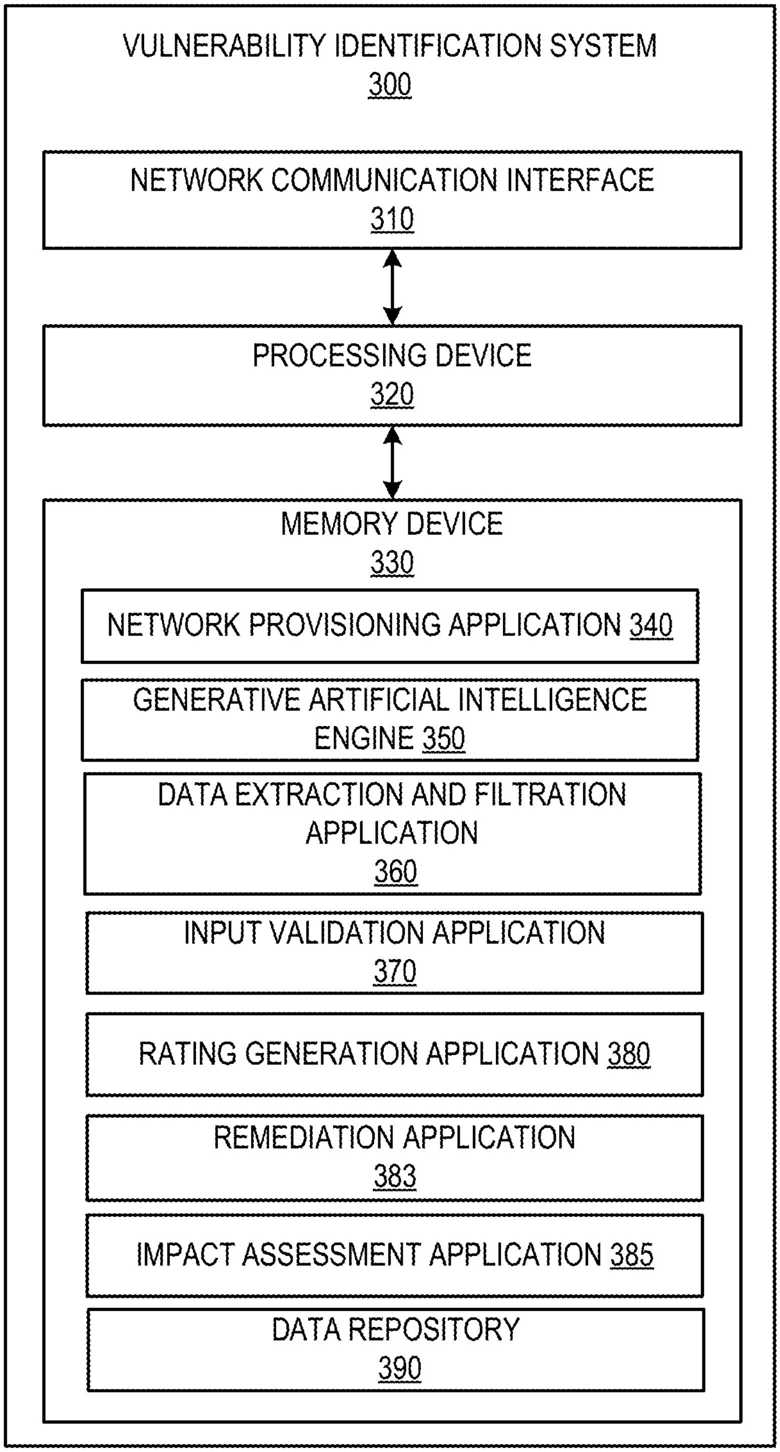
Figure 4:
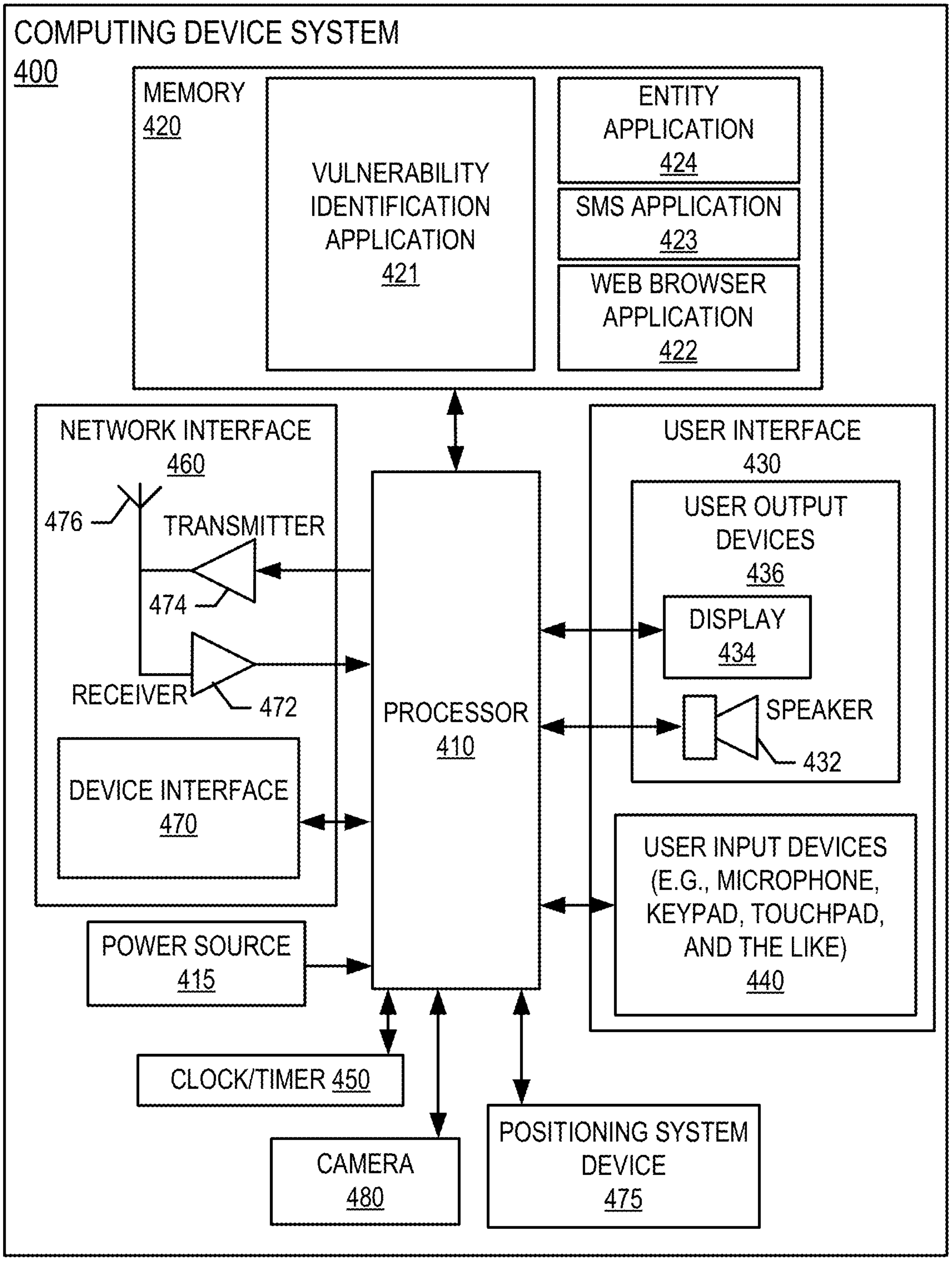
Figure 5:
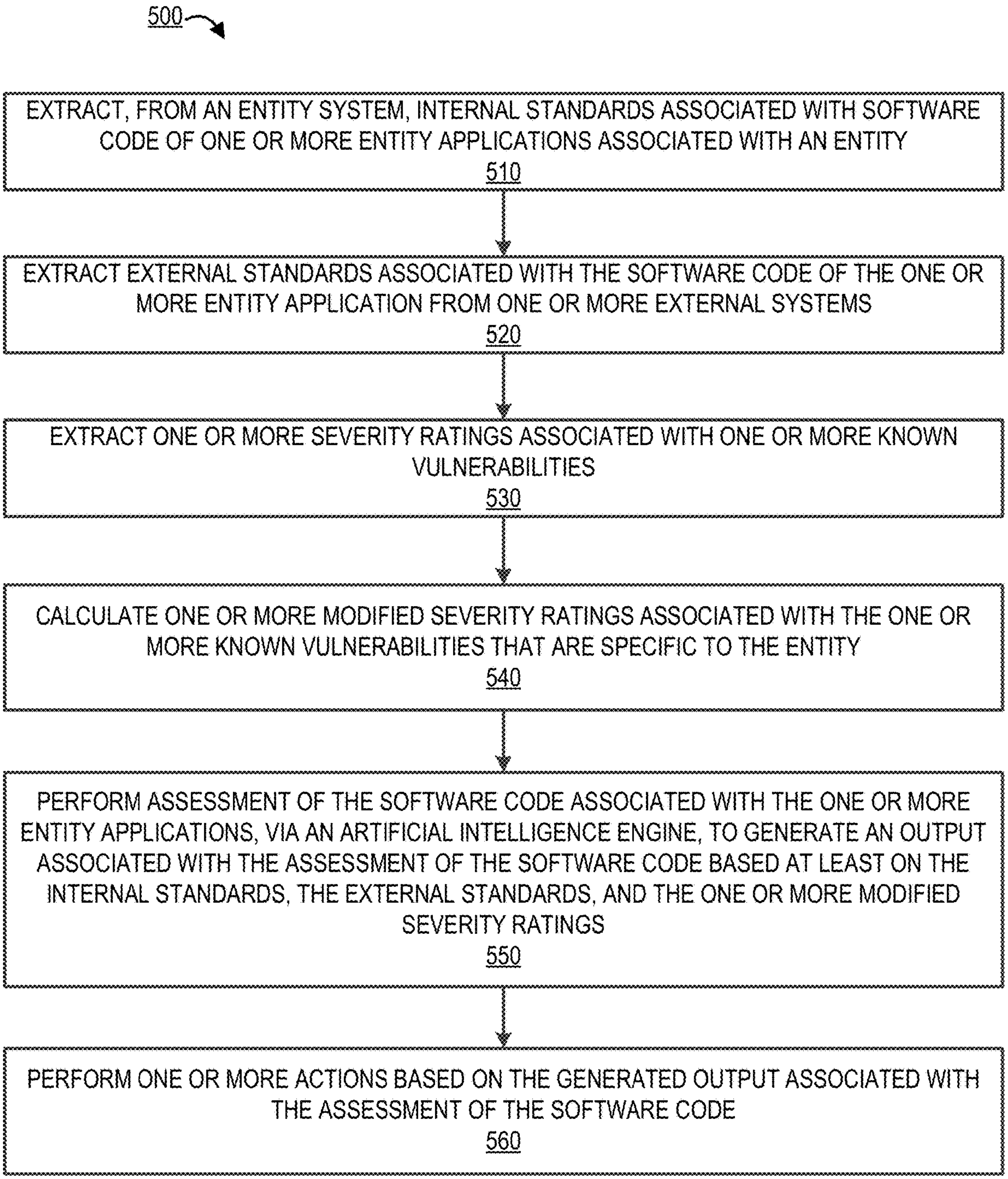

Having thus described embodiments of the invention in general terms, reference will now be made the accompanying drawings, wherein:

FIG. 1 provides a block diagram illustrating a system environment for identifying security vulnerabilities in software code, in accordance with an embodiment of the invention;

FIG. 2 provides a block diagram illustrating the entity system 200 of FIG. 1, in accordance with an embodiment of the invention;

FIG. 3 provides a block diagram illustrating a vulnerability identification system 300 of FIG. 1, in accordance with an embodiment of the invention;

FIG. 4 provides a block diagram illustrating the computing device system 400 of FIG. 1, in accordance with an embodiment of the invention; and FIG. 5 provides a process flow for identifying security vulnerabilities in software code, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term “a” and/or “an” shall mean “one or more,” even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As described herein, the term "entity" may be any organization that develops, tests, maintains, manages, and/or the like one or more software applications for performing one or more activities associated with the organization. In some embodiments, the entity may be a financial institution which may include herein may include any financial institutions such as commercial banks, thrifts, federal and state savings banks, savings and loan associations, credit unions, investment companies, insurance companies and the like. In some embodiments, the entity may be a non-financial institution. As described herein, a "user" may be an employee, a customer, or a potential customer of the entity.

Many of the example embodiments and implementations described herein contemplate interactions engaged in by a user with a computing device and/or one or more communication devices and/or secondary communication devices. Furthermore, as used herein, the term "user computing device" or "mobile device" may refer to mobile phones, computing devices, tablet computers, wearable devices, smart devices and/or any portable electronic device capable of receiving and/or storing data therein.

A "user interface" is any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user or to output data to a user. These input and output devices may include a display, mouse, keyboard, button, touchpad, touch screen, microphone, speaker, LED, light, joystick, switch, buzzer, bell, and/or other user input/output device for communicating with one or more users.

Entities may use one or more software applications for performing one or more activities associated with the entity, where each of the one or more software applications comprise software code that may or may not be developed by the entity. Current conventional systems do not have the capability to identify security related vulnerabilities in software code developed, used, managed, maintained, and/or the like by the entity. As such, there exists a need for a system that can identify one or more security vulnerabilities in the software code associated with the one or more software applications associated with the entity.

FIG. 1 provides a block diagram illustrating a system environment 100 for identifying security vulnerabilities in software code, in accordance with an embodiment of the invention. As illustrated in FIG. 1, the environment 100 includes a vulnerability identification system 300, an entity system 200, external systems 201, and a computing device system 400. One or more users 110 may be included in the system environment 100, where the users 110 interact with the other entities of the system environment 100 via a user interface of the computing device system 400. In some embodiments, the one or more user(s) 110 of the system environment 100 may be customers of an entity associated with the entity system 200. In some embodiments, the one or more users 110 may be potential customers of the entity associated with the entity system 200. In some embodiments, the one or more users 110 may be employees of the entity associated with the entity system 200.

The entity system(s) 200 may be any system owned or otherwise controlled by an entity to support or perform one or more process steps described herein. In some embodiments, the entity may be any organization that develops, tests, manages, maintains, uses, and/or the like one or more software applications for performing one or more activities associated with the entity. In some embodiments, the entity is a financial institution. In some embodiments, the entity is a non-financial institution. In some embodiments, the one or more software applications may be developed by the entity. In some embodiments, one or more parts of the software code associated with the one or more software applications may be developed by other entities and utilized by the entity. In some embodiments, the external systems 201 may be any systems that provide information associated with severity ratings of known vulnerabilities, industry standards, industry best practices, and/or the like for process flows described herein.

The vulnerability identification system 300 is a system of the present invention for performing one or more process steps described herein. In some embodiments, the vulnerability identification system 300 may be an independent system. In some embodiments, the vulnerability identification system 300 may be a part of the entity system 200. In some embodiments, the vulnerability identification system 300 may be controlled, owned, managed, and/or maintained by the entity associated with the entity system 200.

The vulnerability identification system 300, the entity system 200, and the computing device system 400 may be in network communication across the system environment 100 through the network 150. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet. In general, the vulnerability identification system 300 is configured to communicate information or instructions with the entity system 200, and/or the computing device system 400 across the network 150.

The computing device system 400 may be a system owned or controlled by the entity of the entity system 200 and/or the user 110. As such, the computing device system 400 may be a computing device of the user 110. In general, the computing device system 400 communicates with the user 110 via a user interface of the computing device system 400, and in turn is configured to communicate information or instructions with the vulnerability identification system 300, and/or entity system 200 across the network 150.

FIG. 2 provides a block diagram illustrating the entity system 200, in greater detail, in accordance with embodiments of the invention. As illustrated in FIG. 2, in one embodiment of the invention, the entity system 200 includes one or more processing devices 220 operatively coupled to a network communication interface 210 and a memory device 230. In certain embodiments, the entity system 200 is operated by a first entity, such as a financial institution or a non-financial institution.

It should be understood that the memory device 230 may include one or more databases or other data structures/repositories. The memory device 230 also includes computer-executable program code that instructs the processing device 220 to operate the network communication interface 210 to perform certain communication functions of the entity system 200 described herein. For example, in one embodiment of the entity system 200, the memory device 230 includes, but is not limited to, a vulnerability identification application 250, one or more entity applications 270, and a data repository 280. The one or more entity applications 270 may be any applications developed, supported, maintained, utilized, and/or controlled by the entity. The computer-executable program code of the network server application 240, the vulnerability identification application 250, the one or more entity application 270 to perform certain logic, data-extraction, and data-storing functions of the entity system 200 described herein, as well as communication functions of the entity system 200.

The network server application 240, the vulnerability identification application 250, and the one or more entity applications 270 are configured to store data in the data repository 280 or to use the data stored in the data repository 280 when communicating through the network communication interface 210 with the vulnerability identification system 300, and/or the computing device system 400 to perform one or more process steps described herein. In some embodiments, the entity system 200 may receive instructions from the vulnerability identification system 300 via the vulnerability identification application 250 to perform certain operations. The vulnerability identification application 250 may be provided by the vulnerability identification system 300. The one or more entity applications 270 may be any of the applications used, created, modified, facilitated, developed, and/or managed by the entity system 200.

FIG. 3 provides a block diagram illustrating the vulnerability identification system 300 in greater detail, in accordance with embodiments of the invention. As illustrated in FIG. 3, in one embodiment of the invention, the vulnerability identification system 300 includes one or more processing devices 320 operatively coupled to a network communication interface 310 and a memory device 330. In certain embodiments, the vulnerability identification system 300 is operated by an entity, such as a financial institution. In some embodiments, the vulnerability identification system 300 is owned or operated by the entity of the entity system 200. In some embodiments, the vulnerability identification system 300 may be an independent system. In alternate embodiments, the vulnerability identification system 300 may be a part of the entity system 200.

It should be understood that the memory device 330 may include one or more databases or other data structures/repositories. The memory device 330 also includes computer-executable program code that instructs the processing device 320 to perform processing operations described herein and to operate the network communication interface 310 to perform certain communication functions of the vulnerability identification system 300. For example, in one embodiment of the vulnerability identification system 300, the memory device 330 includes, but is not limited to, a network provisioning application 340, a generative artificial intelligence engine 350, a data extraction and filtration application 360, an input validation application 370, a rating generation application 380, a remediation application 383, an impact assessment application 385, and a data repository 390 comprising any data processed or accessed by one or more applications in the memory device 330. The computer-executable program code of the network provisioning application 340, the generative artificial intelligence engine 350, the data extraction and filtration application 360, the input validation application 370, the rating generation application 380, the remediation application 383, and the impact assessment application 385 may instruct the processing device 320 to perform certain logic, data-processing, and data-storing functions of the vulnerability identification system 300 described herein, as well as communication functions of the vulnerability identification system 300.

The network provisioning application 340, the generative artificial intelligence engine 350, the data extraction and filtration application 360, the input validation application 370, the rating generation application 380, the remediation application 383, and the impact assessment application 385 are configured to invoke or use the data in the data repository 390 when communicating through the network communication interface 310 with the entity system 200, and/or the computing device system 400. In some embodiments, the network provisioning application 340, the generative artificial intelligence engine 350, the data extraction and filtration application 360, the input validation application 370, the rating generation application 380, the remediation application 383, and the impact assessment application 385 may store the data extracted or received from the entity system 200, and the computing device system 400 in the data repository 390. In some embodiments, the network provisioning application 340, the generative artificial intelligence engine 350, the data extraction and filtration application 360, the input validation application 370, the rating generation application 380, the remediation application 383, and the impact assessment application 385 may be a part of a single application (e.g., modules).

FIG. 4 provides a block diagram illustrating a computing device system 400 of FIG. 1 in more detail, in accordance with embodiments of the invention. However, it should be understood that a mobile telephone is merely illustrative of one type of computing device system 400 that may benefit from, employ, or otherwise be involved with embodiments of the present invention and, therefore, should not be taken to limit the scope of embodiments of the present invention. Other types of computing devices may include portable digital assistants (PDAs), pagers, mobile televisions, desktop computers, workstations, laptop computers, cameras, video recorders, audio/video player, radio, GPS devices, wearable devices, Internet-of-things devices, augmented reality devices, virtual reality devices, automated teller machine devices, electronic kiosk devices, or any combination of the aforementioned.

Some embodiments of the computing device system 400 include a processor 410 communicably coupled to such devices as a memory 420, user output devices 436, user input devices 440, a network interface 460, a power source 415, a clock or other timer 450, a camera 480, and a positioning system device 475. The processor 410, and other processors described herein, generally include circuitry for implementing communication and/or logic functions of the computing device system 400. For example, the processor 410 may include a digital signal processor device, a microprocessor device, and various analog to digital converters, digital to analog converters, and/or other support circuits. Control and signal processing functions of the computing device system 400 are allocated between these devices according to their respective capabilities. The processor 410 thus may also include the functionality to encode and interleave messages and data prior to modulation and transmission. The processor 410 can additionally include an internal data modem. Further, the processor 410 may include functionality to operate one or more software programs, which may be stored in the memory 420. For example, the processor 410 may be capable of operating a connectivity program, such as a web browser application 422. The web browser application 422 may then allow the computing device system 400 to transmit and receive web content, such as, for example, location-based content and/or other web page content, according to a Wireless Application Protocol (WAP), Hypertext Transfer Protocol (HTTP), and/or the like.

The processor 410 is configured to use the network interface 460 to communicate with one or more other devices on the network 150. In this regard, the network interface 460 includes an antenna 476 operatively coupled to a transmitter 474 and a receiver 472 (together a "transceiver"). The processor 410 is configured to provide signals to and receive signals from the transmitter 474 and receiver 472, respectively. The signals may include signaling information in accordance with the air interface standard of the applicable cellular system of the wireless network 152. In this regard, the computing device system 400 may be configured to operate with one or more air interface standards, communication protocols, modulation types, and access types. By way of illustration, the computing device system 400 may be configured to operate in accordance with any of a number of first, second, third, and/or fourth-generation communication protocols and/or the like.

As described above, the computing device system 400 has a user interface that is, like other user interfaces described herein, made up of user output devices 436 and/or user input devices 440. The user output devices 436 include a display 430 (e.g., a liquid crystal display or the like) and a speaker 432 or other audio device, which are operatively coupled to the processor 410.

The user input devices 440, which allow the computing device system 400 to receive data from a user such as the user 110, may include any of a number of devices allowing the computing device system 400 to receive data from the user 110, such as a keypad, keyboard, touch-screen, touchpad, microphone, mouse, joystick, other pointer device, button, soft key, and/or other input device(s). The user interface may also include a camera 480, such as a digital camera.

The computing device system 400 may also include a positioning system device 475 that is configured to be used by a positioning system to determine a location of the computing device system 400. For example, the positioning system device 475 may include a GPS transceiver. In some embodiments, the positioning system device 475 is at least partially made up of the antenna 476, transmitter 474, and receiver 472 described above. For example, in one embodiment, triangulation of cellular signals may be used to identify the approximate or exact geographical location of the computing device system 400. In other embodiments, the positioning system device 475 includes a proximity sensor or transmitter, such as an RFID tag, that can sense or be sensed by devices known to be located proximate a merchant or other location to determine that the computing device system 400 is located proximate these known devices.

The computing device system 400 further includes a power source 415, such as a battery, for powering various circuits and other devices that are used to operate the computing device system 400. Embodiments of the computing device system 400 may also include a clock or other timer 450 configured to determine and, in some cases, communicate actual or relative time to the processor 410 or one or more other devices.

The computing device system 400 also includes a memory 420 operatively coupled to the processor 410. As used herein, memory includes any computer readable medium (as defined herein below) configured to store data, code, or other information. The memory 420 may include volatile memory, such as volatile Random Access Memory (RAM) including a cache area for the temporary storage of data. The memory 420 may also include non-volatile memory, which can be embedded and/or may be removable. The non-volatile memory can additionally or alternatively include an electrically erasable programmable read-only memory (EEPROM), flash memory or the like.

The memory 420 can store any of a number of applications which comprise computer-executable instructions/code executed by the processor 410 to implement the functions of the computing device system 400 and/or one or more of the process/method steps described herein. For example, the memory 420 may include such applications as a conventional web browser application 422, a vulnerability identification application 421, entity application 424.

These applications also typically instructions to a graphical user interface (GUI) on the display 430 that allows the user 110 to interact with the entity system 200, the vulnerability identification system 300, and/or other devices or systems. The memory 420 of the computing device system 400 may comprise a Short Message Service (SMS) application 423 configured to send, receive, and store data, information, communications, alerts, and the like via the wireless telephone network 152. In some embodiments, the vulnerability identification application 421 provided by the vulnerability identification system 300 allows the user 110 to access the vulnerability identification system 300. In some embodiments, the entity application 424 provided by the entity system 200 and the vulnerability identification application 421 allow the user 110 to access the functionalities provided by the vulnerability identification system 300 and the entity system 200.

The memory 420 can also store any of a number of pieces of information, and data, used by the computing device system 400 and the applications and devices that make up the computing device system 400 or are in communication with the computing device system 400 to implement the functions of the computing device system 400 and/or the other systems described herein.

FIG. 5 provides a flowchart 500 illustrating a process flow for identifying security vulnerabilities in software code, in accordance with an embodiment of the invention. As shown in block 510, the system extracts, from an entity system, internal standards associated with software code of one or more entity applications associated with an entity. The internal standards may be associated with any standards established by the entity for development and/or use of the software code associated with the one or more entity applications. Examples of internal standards may comprise coding standards, best practices, line of business specific coding standards, and/or the like that are associated with providing consistency and uniformity across codebases, readability, error prevention, scalability, cross team collaboration, effective code reviews, efficient maintenance of the software code, and/or the like.

As shown in block 520, the system extracts external standards associated with the software code of the one or more entity application from one or more external systems. External standards may be associated with any standards generally established within the industry which may comprise industry-specific coding standards and/or the like for development of software code.

As shown in block 530, the system extracts one or more severity ratings associated with one or more known vulnerabilities. The one or more known vulnerabilities may be any known code vulnerabilities that are classified by the external systems as having an impact on functioning of the one or more software applications or systems executing the one or more software applications. For example, an external system may classify a software integrity vulnerability in software code as having severe impact on entity systems executing the software code associated with the one or more entity applications. Each of the external systems may utilize different rating scales to classify and rate the known vulnerabilities. For example, a first external entity may use a 3 point scale for rating a vulnerability and a second external entity may use a 5 point scale for rating the same vulnerability. When severity ratings are extracted from the one or more external systems, each of the severity ratings associated with a single vulnerability may have been calculated using different rating scales, where selection of rating scale by each of the external system may have been based on the needs of the external system. As such, the one or more severity ratings extracted from the external systems may not be useful to the process flow being implemented by the system without further processing. Therefore, the system processes the one or more severity ratings extracted from the external systems to calculate modified severity ratings as explained below.

As shown in block 540, the system calculates one or more modified severity ratings associated with the one or more known vulnerabilities that are specific to the entity. The system upon extracting the one or more severity ratings that are based on different rating scales, calculates modified severity ratings using a rating scale that suits the needs of the entity. Calculating the one or more modified severity ratings may comprise determining a common scale for the entity and converting the one or more severity ratings that are associated with different rating scales to the common scale to generate the one or more modified severity ratings. In some embodiments, various interpolation techniques may be used for calculating the one or more modified severity ratings. In some embodiments, the selection of the common scale may be based on other rating scales used by external systems for calculating the one or more severity ratings associated with the one or more known vulnerabilities. In some embodiments, the calculation may further be based on one or more factors, where the one or more factors may be associated with data processed, used, managed and/or the like by the entity, security measures associated with the entity, software and hardware used by the entity, the internal standards, and/or the like. In one example, the modified severity rating associated with a first vulnerability calculated by the system may be low (which may be based on the one or more factors) on the selected common scale while the severity rating assigned to the first vulnerability by a first external system is high.

As shown in block 550, the system performs assessment of the software code associated with the one or more entity applications, via an artificial intelligence engine, to generate an output associated with the assessment of the software code based at least on the internal standards, the external standards, and the one or more modified severity ratings. The system may train the artificial intelligence engine with the internal standards, external standards, application programming standards, and entity vernacular associated with the entity, where the trained artificial intelligence engine may perform the assessment of the software code based on the training received from the system. In some embodiments, before initiating the assessment of the software code, the artificial intelligence engine may perform input validation of inputs (e.g., the software code, the external standards, the internal standards, the modified severity ratings, and/or the like) provided to the artificial intelligence engine. The system may also train the artificial intelligence engine to perform the input validation. In some embodiments, the output of the assessment of the software code by the artificial intelligence engine may comprise identification of vulnerabilities in the software code, identification of impacts of the vulnerabilities in the software code, and/or the like. In some embodiments, the vulnerabilities identified by the artificial intelligence engine may be based on the known vulnerabilities or vulnerabilities that have resemblance to the known vulnerabilities. Identification of the vulnerabilities by the artificial intelligence engine may be based on internal standards, the external standards, and the one or more modified severity ratings. In one example, the system may identify that the software code does not meet the internal standards and may identify such an anomaly as a vulnerability in the software code. In another example, if the modified severity rating associated with a first vulnerability calculated by the system is low while the severity rating assigned to the first vulnerability by an external system is high, the system may identify the anomaly in the software code as low impact vulnerability.

In some embodiments, after generating the output the system may perform further analysis to identify false positives and false negatives associated with the output generated by the artificial intelligence engine. In some embodiments, the identification of the false positives and the false negatives may be based on user input. In some embodiments, the identification of the false positives and the false negatives may be based on monitoring the execution of the software code. In some embodiments, the identification of the false positives and the false negatives may be based on previously established patterns associated with previously detected false positives and false negatives. Upon identification of the false positives and the false negatives, the system may analyze the output associated with the assessment of the software code to determine one or more patterns in the assessment that led to the false positive and store the one or more patterns in a data repository. In some embodiments, the system may use the one or more patterns to retrain the artificial intelligence engine.

As shown in block 560, the system performs one or more actions based on the generated output associated with the assessment of the software code. The one or more actions may comprise flagging the output for manual review by a user (e.g., user 110), performing one or more remediation actions for decreasing impact of vulnerabilities identified during the assessment of the software code on downstream systems, and tracking the one or more remediation actions.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for identifying security vulnerabilities in software code, the system comprising:

at least one network communication interface;

at least one non-transitory storage device; and at least one processing device coupled to the at least one non-transitory storage device and the at least one network communication interface, wherein the at least one processing device is configured to:

extract, from an entity system, internal standards associated with software code of one or more entity applications associated with an entity;

extract external standards associated with the software code of the one or more entity applications from one or more external systems;

extract one or more severity ratings associated with one or more known vulnerabilities from the one or more external systems, wherein the one or more severity ratings from the one or more external system are based on different rating scales;

calculate one or more modified severity ratings associated with the one or more known vulnerabilities that are specific to the entity based on converting the one or more severity ratings that are based on the different rating scales to on an entity-specific scale associated with the entity;

perform assessment of the software code associated with the one or more entity applications, via an artificial intelligence engine, to generate an output associated with the assessment of the software code based at least on the internal standards, the external standards, and the one or more modified severity ratings; and perform one or more actions based on the generated output associated with the assessment of the software code.

2. The system of claim 1, wherein the one or more actions comprise at least one of:

flagging the output for manual review;

performing one or more remediation actions for decreasing impact of vulnerabilities identified during the assessment of the software code on downstream systems; and tracking the one or more remediation actions.

3. The system of claim 1, wherein the at least one processing device is configured to train the artificial intelligence engine with the internal standards, external standards, application programming standards, and entity vernacular associated with the entity.

4. The system of claim 1, wherein the at least one processing device is configured to train the artificial intelligence engine to perform input validation.

5. The system of claim 1, wherein the at least one processing device is configured to:

receive an indication that the output is a false positive;

analyze the output associated with the assessment of the software code to determine one or more patterns in the assessment that led to the false positive; and store the one or more patterns in a data repository.

6. The system of claim 5, wherein the at least one processing device is configured to retrain the artificial intelligence engine with the one or more patterns.

7. The system of claim 1, wherein the at least one processing device is configured to determine the entity-specific scale based on the different rating scales that are associated with the one or more severity ratings and one or more factors associated with the entity.

8. A computer program product for identifying security vulnerabilities in software code, the computer program product comprising a non-transitory computer-readable storage medium having computer executable instructions for causing a computer processor to perform the steps of:

extracting, from an entity system, internal standards associated with software code of one or more entity applications associated with an entity;

extracting external standards associated with the software code of the one or more entity applications from one or more external systems;

extracting one or more severity ratings associated with one or more known vulnerabilities, wherein the one or more severity ratings from the one or more external system are based on different rating scales;

calculating one or more modified severity ratings associated with the one or more known vulnerabilities that are specific to the entity based on converting the one or more severity ratings that are based on the different rating scales to on an entity-specific scale associated with the entity;

performing assessment of the software code associated with the one or more entity applications, via an artificial intelligence engine, to generate an output associated with the assessment of the software code based at least on the internal standards, the external standards, and the one or more modified severity ratings; and performing one or more actions based on the generated output associated with the assessment of the software code.

9. The computer program product of claim 8, wherein the one or more actions comprise at least one of:

flagging the output for manual review;

performing one or more remediation actions for decreasing impact of vulnerabilities identified during the assessment of the software code on downstream systems; and tracking the one or more remediation actions.

10. The computer program product of claim 8, wherein the computer executable instructions cause the computer processor to perform the step of training the artificial intelligence engine with the internal standards, external standards, application programming standards, and entity vernacular associated with the entity.

11. The computer program product of claim 8, wherein the computer executable instructions cause the computer processor to perform the steps of:

receiving an indication that the output is a false positive;

analyzing the output associated with the assessment of the software code to determine one or more patterns in the assessment that led to the false positive; and storing the one or more patterns in a data repository.

12. A computer implemented method for identifying security vulnerabilities in software code, wherein the method comprises:

extracting, from an entity system, internal standards associated with software code of one or more entity applications associated with an entity;

extracting external standards associated with the software code of the one or more entity applications from one or more external systems;

extracting one or more severity ratings associated with one or more known vulnerabilities, wherein the one or more severity ratings from the one or more external system are based on different rating scales;

calculating one or more modified severity ratings associated with the one or more known vulnerabilities that are specific to the entity based on converting the one or more severity ratings that are based on the different rating scales to on an entity-specific scale associated with the entity;

performing assessment of the software code associated with the one or more entity applications, via an artificial intelligence engine, to generate an output associated with the assessment of the software code based at least on the internal standards, the external standards, and the one or more modified severity ratings; and performing one or more actions based on the generated output associated with the assessment of the software code.

13. The computer implemented method of claim 12, wherein the one or more actions comprise at least one of:

flagging the output for manual review;

performing one or more remediation actions for decreasing impact of vulnerabilities identified during the assessment of the software code on downstream systems; and tracking the one or more remediation actions.

14. The computer implemented method of claim 12, wherein the method comprises:

receiving an indication that the output is a false positive;

analyzing the output associated with the assessment of the software code to determine one or more patterns in the assessment that led to the false positive; and storing the one or more patterns in a data repository.

* * * * *